United States Patent [19]

Fraanje et al.

[11] 3,844,052
[45] Oct. 29, 1974

[54] METHOD OF MANUFACTURING A SCALE MODEL OF A ROADWAY

[75] Inventors: Marinus Joost Fraanje, Enckelaan; Rudolf Gerard Jan Maarhuis, Kometelaan; Frans Noorman, Wenckebachplantsoen, all of Netherlands

[73] Assignee: Grontmij Grondverbetering- En Ontginningmaatschappij N.V.

[22] Filed: Aug. 7, 1972

[21] Appl. No.: 278,223

[52] U.S. Cl. ............................ 35/16, 35/7 A, 35/41
[51] Int. Cl. .......................................... G09b 25/06
[58] Field of Search ........ 33/1 G, 1 Q, 228; 35/7 R, 35/7 A, 16, 27, 41, 53

[56] References Cited
UNITED STATES PATENTS

| | | | |
|---|---|---|---|
| 2,645,040 | 7/1953 | Beck-Meyer | 35/53 |
| 2,738,584 | 3/1956 | Parker | 35/16 X |
| 3,068,591 | 12/1962 | Bielinski | 35/41 |

FOREIGN PATENTS OR APPLICATIONS

| | | | |
|---|---|---|---|
| 679,163 | 2/1964 | Canada | 35/7 A |
| 152,334 | 12/1962 | U.S.S.R. | 35/16 |

OTHER PUBLICATIONS

Farmhouse Cutouts, Dept. of Agriculture, Misc. Pub., No. 622, May 1947, Front Cover and pages 2, 3, 27 only.

*Primary Examiner*—Harland S. Skogquist
*Attorney, Agent, or Firm*—Young & Thompson

[57] ABSTRACT

A scale model of a roadway or the like is constructed by drawing a plan view of the roadway on flexible material and marking on that plan view coordinates corresponding to transverse lines on the roadway whose elevation and inclination are predeterminable. A plurality of supports are then arranged on a base surface, with each support having a transverse upper support arm adjusted to the elevation and inclination of one of the coordinates on the plan view. The plan view is cut from the flexible material along the margins of the roadway and is laid on the supports with the coordinates in registry with the corresponding support arms. The flexible material may be backed with metal foil for magnetic securement to the support arms. The region around the supports can be filled in with granular material such as synthetic resin particles, to indicate the adjacent terrain.

6 Claims, 6 Drawing Figures

PATENTED OCT 29 1974 3,844,052
SHEET 1 OF 4
Fig-1
Fig-2
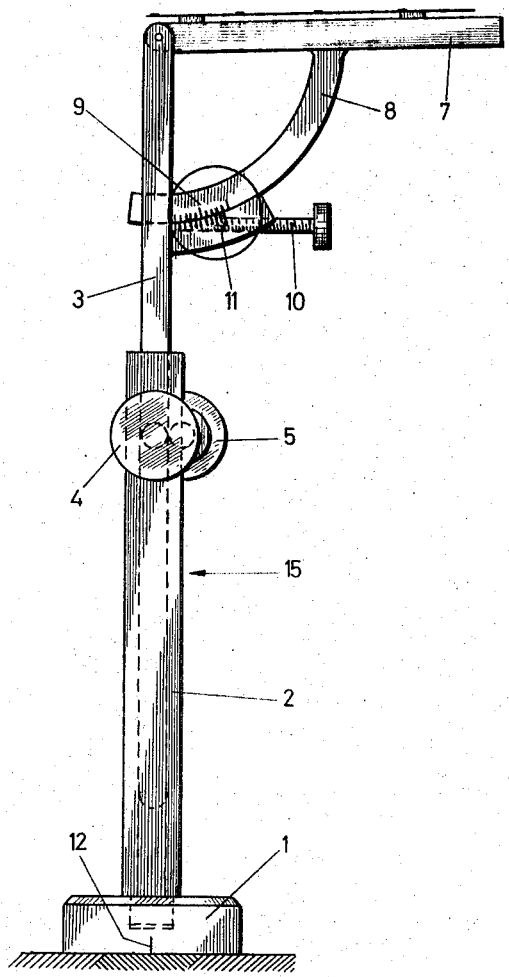
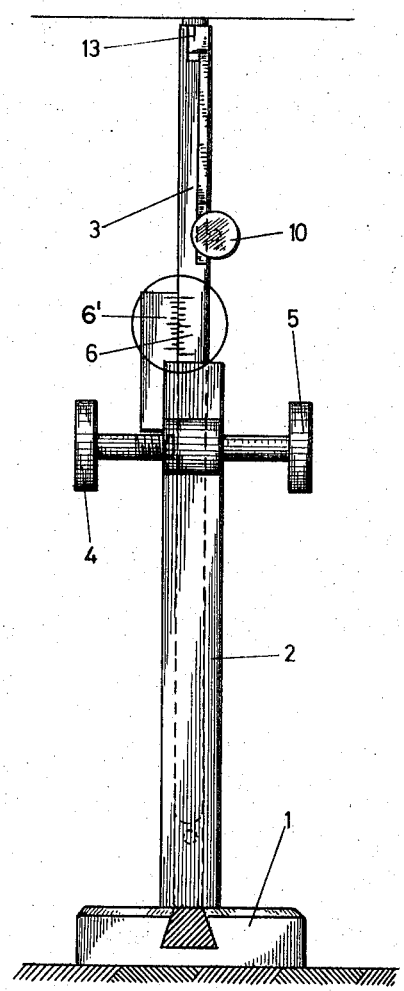

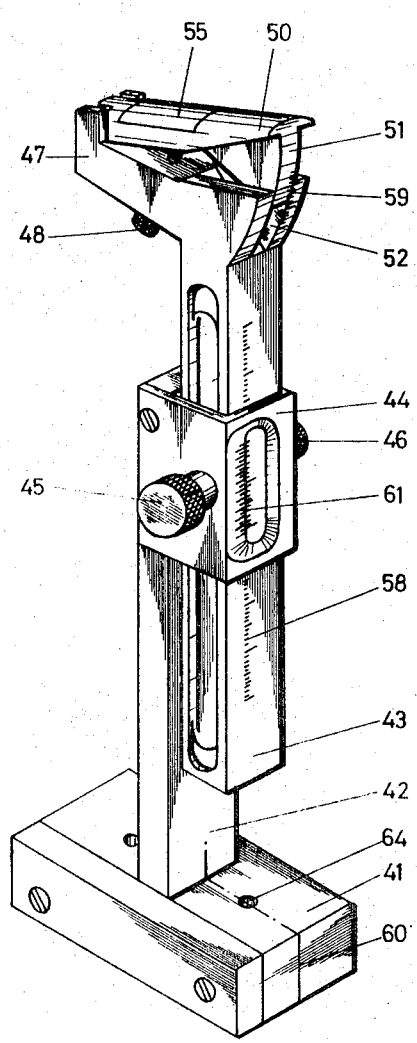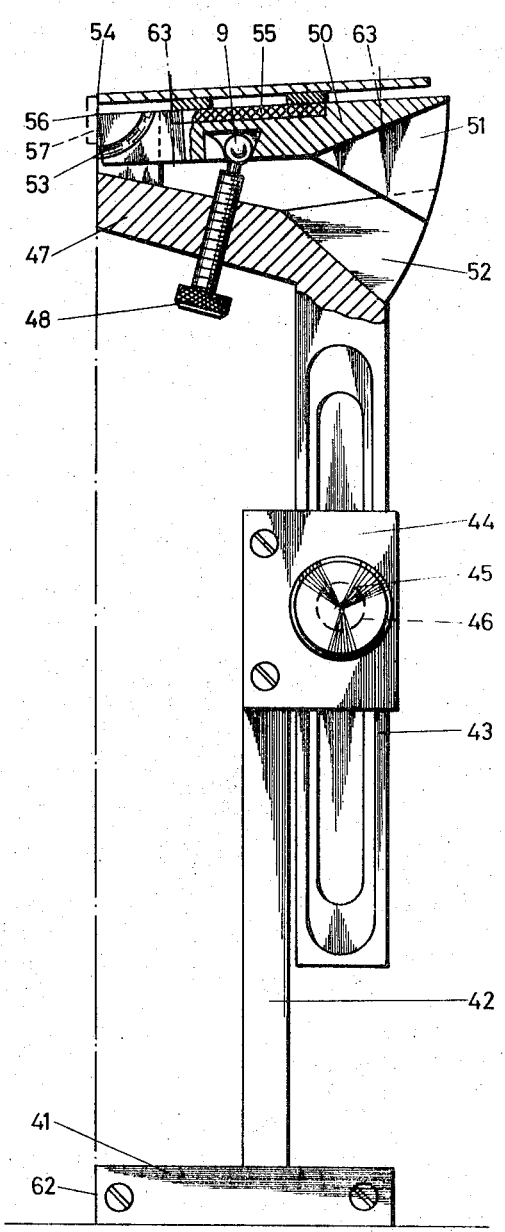

METHOD OF MANUFACTURING A SCALE MODEL OF A ROADWAY

The invention relates to a method of manufacturing a scale model of a roadway, such as a level intersection or an intersection with different levels together with their connecting roads or parts thereof. Such a method is generally known. Common practice in the manufacturing of scale models of highways and intersections or the like is to make a scale model from wood or other suitable materials. Although such scale models are excellent for judging the shape and lines of the roadway, they require a great deal of work with high losses of material which increases the costs. The manufacturing of the scale model requires so much time that it happens in practice that building of the model and the real construction in practice overlap each other, so that possible mistakes, found later on with the model, hardly or even not at all can be amended in practice. Storing a wooden model requires much space and accordingly is very expensive.

It has already been proposed to obtain an impression about the alignment and form of highways and the like by placing supporting members along the axes of the highway of which the adjustable upper part is adjusted in accordance with the local heights of the highway. According to said known method the supports have transverse members with vertically adjustable means, adapted to support on it a transverse member, by means of which the angle of the transverse slope can be indicated. Said support members can be interconnected by means of cords. This means that the alignment and form of the highway has to be derived from a number of spaced apart transverse lines interconnected by straight cords. This is very complicated and does not give a proper view of the required form. Today clothoids are frequently used for the design of transition curves in roadway constructions. In this respect also this older proposal does not provide a proper solution.

The object of the invention is to provide a method for the manufacturing of a scale model to enable a three dimensional check of form and alignment of highways, roadways and intersections, by means of which the model can be obtained quickly and with high accuracy and this at any desired scale.

According to the invention this has been achieved in that a plan view of the intersection or roadway is transfered to a sheet of flexible material from which the roadplan is cut, which roadplan subsequently is placed upon transversely extending upper arms of supports, placed in accordance with the axis of the road upon a flat surface and having their inclination adjusted in accordance with the local angle.

By said method the manufacturing of a model is considerably simplified, since it becomes sufficient to print the roadway or intersection at the desired scale, to cut the plan from said print after which a certain number of coordinates is chosen upon the plan view and the supports are place upon said coordinates whilst the arms of the supports are adjusted at the proper height and at the correct angle, after which the cut-out plan is placed upon said supports. The chosen coordinates can be collected as a preparatory measure into a table, so that mounting and adjustment of the support can take place very quickly. With such a model adjustments and amendments can be performed very quickly, for instance by adjusting a number of supports. In practice the plan view forms the basis for the calculation of the three dimensional coordinates of the construction to be made. This always has the disadvantage that where straight, curved or for instance clothoidal alignments meet each other the points of transfer change their place. Now when the calculation is done by means of a computer this computer delivers a list and the scale model now can be prepared on the basis of said list. The mistakes then can be easily found and on the basis of said mistakes new calculations can be made leading to a change of the design which can easily be controlled by means of the prescribed method of manufacturing the scale model. Due to this it becomes possible within a rather short period to find the ideal alignment of the road, in particular at intersections, which makes it possible to amend in time the work under construction.

It has been proposed in the past to use a flexible rod supported by means of supports, which rod in a three dimensional way corresponds to the axis fo the roadway to be made. Such a method as well is not suitable for the judgement of technical details, such as the shape of access and exit lanes, aprons, banking and its transition, view lengths and brake lengths, protecting lines and beacons.

Such a bent rod is an undefined spacial curve having no exact elements such as straight portions, circles and transition curves, but only giving an overall impression about the extent of the road axis.

According to a further development of the invention it is possible to apply a layer of granular material upon the flat surface, marking the height of the surface and upon which or in which the slope between roadplan and surface can be applied by using granular material. By means of this granular material, preferably comprising broken grains of synthetic resin, it is possible to indicate the desired slope in the model so that the environment of the road can be judged as well whilst further it becomes possible to define the volume of the slope with the aid of the model. If necessary a binder can be applied to the granular material by mixing, spraying or the like, so that e.g. rock formations can be indicated.

A support is adapted to perform the method, which support is characterized in that it comprises two members vertically shiftable with respect to each other, which can be adjusted with respect to each other with high accuracy and further comprising a supporting arm pivotably connected to the upper end of the upper member and of which the inclination can be adjusted with high accuracy. With such a support height and inclination of the support arm can be adjusted with high precision whereas there are no parts extending above the model which might hamper the view.

According to a preferred embodiment of the support the shiftable part may be provided at its upper end with an inclined upwardly and laterally extending arm, having an open in cross-section rectangular slot in which the vertical leg has been guided of a T-shaped support arm which arm at the outer end of the fixed arm of the shiftable part has been pivotably connected by means of a tongue and groove connection of circular shape having its centre of curvature at the theoretical pivot point and of which the other end at the outer side of the fixed arm as well as of the support arm are curved about the same centre of curvature as the pivot, said outer side being provided with a scale whilst further between the ends a screw for adjustments has been provided. This embodiment of the supports is very rigid and accordingly very accurate. The theoretical centre of curvature of the pivot can be provided at the corner of the adjacent end of the support arm. According to the above described method for making a scale model a cut-out plate will be placed upon the support arms and this plate has a certain thickness. According to the invention it now is possible to have the theoretical centre at a distance above the upper edge of the support arm corresponding to the thickness of the plate to be placed upon the support. This has the result that adjustments of the support arm to change the inclination or banking of the road-surface in the model, the upper edge exactly remains at the same height. This facilitates adjustments and avoids the introduction of other mistakes, which due to adjustments of the model are introduced in the work to be performed.

The scale at a fixed and shiftable part of the support can be at the same side as the scale upon the support arm, so that both scales can be read from one side which side as a rule will be the side turned to the outer side of the model.

The invention now will be further elucidated with reference to the drawings.

FIG. 1 is a side-view of a support for use in practicing a method according to the invention.

FIG. 2 is a front-view of the support of FIG. 1.

FIG. 5 is another embodiment of the support shown in a perspective view.

FIG. 6 is a cross-section through the support shown in FIG. 5.

Figure 3:
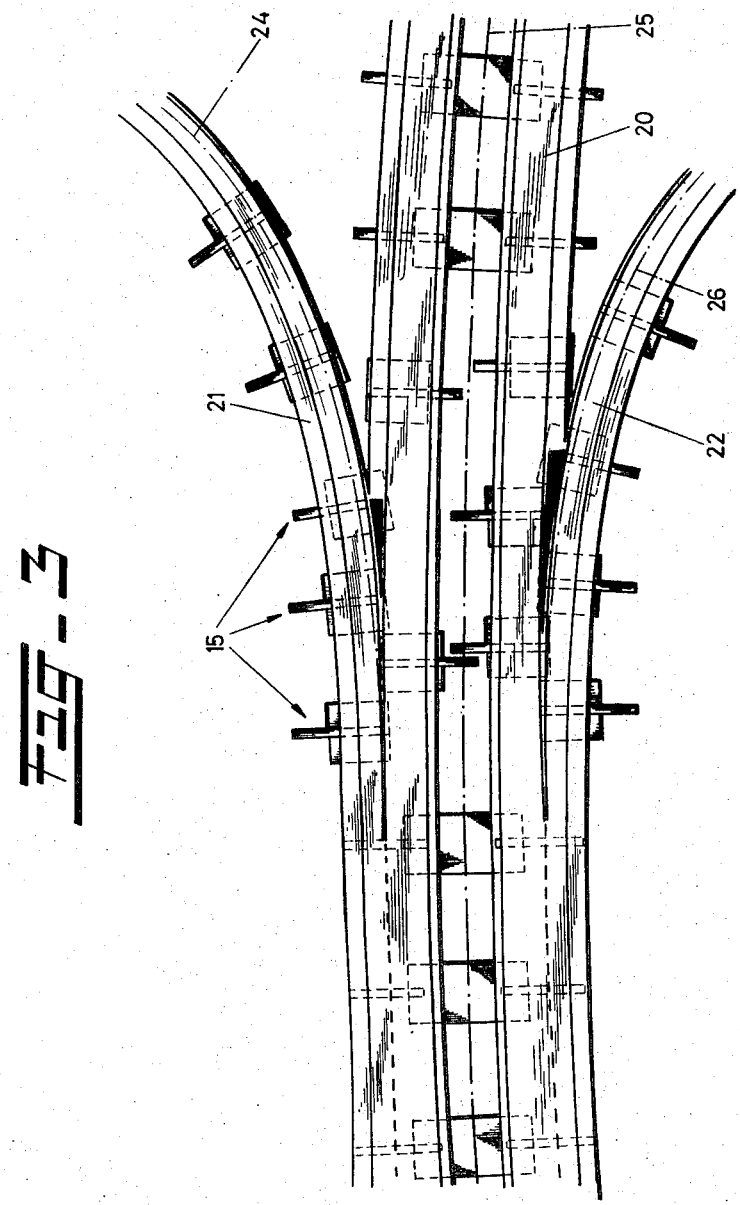
FIG. 3 is a part of a scale model obtained by applying the method according to the invention.

The support 15 shown in FIGS. 1 and 2 comprises a base 1, which can be of magnetic material and upon which a vertical tube 2 has been mounted. Within the tube 2 another tube or rod 3 is shiftably mounted. The tube 3 can be fixed in each position with respect to the tube 2. In the shown embodiment this is achieved by providing the upper tube 3 with a teeth rack with two adjusting screws 4 and 5, one of which serves for rough adjustment and the other for fine adjustment. The upper tube 3 also can be provided with a scale indicated at 6, whilst the lower tube may have a nonius 6', so that the height of the support can be adjusted with high precision.

A support arm 7 is pivotably connected to the upper end of the upper tube 3. At the underside the arm 7 has been provided with a circle segment 8 having teeth and a scale 9. Said teeth of the segment 8 cooperate with the horizontal adjustment screw 10. A nonius 11 can be provided as well allowing accurate adjustment of the arm 7 by means of the screw 10. Upon the upper side of the arm 7 magnetic elements are provided so that the cut-out roadplan against the lower side of which a metal foil can be adhered, can be fixed with respect to the support.

In FIG. 3 as an example a portion of a scale model of a highway intersection has been shown comprising a highway 20 with an access lane 21 and an exit lane 22. To realize this model a planview of the intersection has been transferred to flexible material, in this case paper of 180 g/m², which planview showed the complete alignment and calculated axes 24, 25, 26. From said planview the roadplan has been cut.

A second planview at the same scale as the first one is used as a reference surface upon which the support has to be placed. This second planview is not necessary but by using it the placing of the support is considerably simplified. The supports 15 according to FIGS. 1 and 2 are placed in predetermined points upon the axis of the intersection upon the second planview. At said points height and banking are exactly known. To simplify this the base of each support 15 has been provided with a mark such as 12 in FIG. 1, giving exactly the location of the axis and enabling one to place the support with the support arm precisely at a right angle to the axis. It will be clear that it depends on the exact design of the supports where said mark or marks have to be made. Before the supports are placed upon the second planview height and angle of the support arm are adjusted in correspondence with height and banking of the road at the location where the support has to be placed.

After having placed all supports 15 the first cut-out plan of the road is placed upon the support arms. To obtain a connection the lower side of said cut-out plan can be provided with a metal foil, attracted by magnets provided in the support arms or attracted by magnetic support arms. To obtain an exact adjustment of the cut-out plan the perpendicular lines are drawn at those points of the axes corresponding to the points where supports have to be placed whereas the supporting arms have marks such as 13 in FIG. 2, which have to be placed exactly above said perpendicular lines. The scale model then is finished in principle.

It follows from the preceding description that a three dimensional view of the road intersection or part of it can be made in a quick and simple way which is excellent for the control of the form. The several parts of the road can be controlled by means of a periscope or photo-camera to check the shape of the access and exit lanes, changes of direction, view lengths and brake lengths. Furthermore it is very simple to amend possible mistakes, since as a rule it will be sufficient to change the adjustment of a number of supports after which said portion of the road can be checked again. This method is in particular suitable to be used in combination with a computer. To do this a number of data of the intersection to be designed is fed into the computer, which then for the required number of points calculates the three dimensional coordinates and the banking in the form of tables or lists. Said tables then can be used as the basis for composing the scale model. If during checking up a certain portion of the road appears not to be correct then said portion can be recalculated with amended data and the new results then can be transferred to the model in a very simple way.

Figure 4:
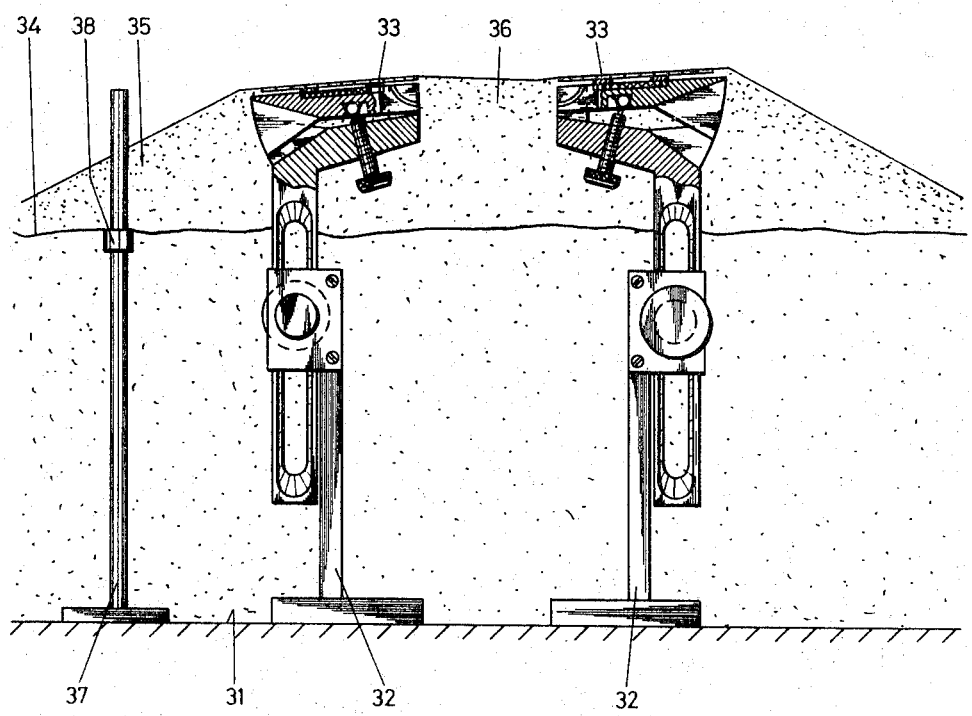
FIG. 4 is a cross-section through a scale model showing a further development of the invention.

FIG. 4 indicates how the environment can be shown in the model. The drawing shows a table surface 31 upon which a number of supports 32 are placed of which only two are shown in FIG. 4 and with each support a plate 33 of for instance a road having two roadways. The support arms of the supports are adjusted at an angle to indicate that the road is curved at the point shown in the drawing.

Upon the table surface 31 a layer of granular material has been applied, the upper surface 34 of which is at the height of the surface of the normal level. Above this level 34 another layer, for instance made from granular material having a different colour, has been applied to indicate the slope 35 and the central verge 36.

The level of the surface can be indicated by means of one or more standards 37.

It will be clear that in this way changes of the model can be made very easily by simply removing the granular material locally.

The embodiment of the support shown in FIGS. 5 and 6 has a base 41, an upwardly directed leg 42 and a shiftable leg 43. The vertical shiftable leg 43 is guided within a rectangular housing 44 and is adjustable in vertical direction by means of a fine adjustment mechanism 45 with screw 46 for fixing the adjustment. A mechanism of this kind is known per se.

The vertical shiftable leg 43 has at its upper end an integral arm 47 with adjustment screw 48, which by means of a ball pivot 49 is connected with an adjustable support arm 50. This arm 50 is T-shaped at 51 with the vertical flange of the T-shape guided within a slot 52 of the integral arm 47.

The left hand end of the arm 50 is pivotably connected with the opposite side-walls of the slot 52 by means of a circular tongue and groove connection 53, having its centre of curvature at 54. This connection can be made by making grooves in the opposite side-walls of the legs at the end of the integral arm 47 engaged by tongues in the opposite sides of the support arm. The reverse is possible as well.

The point 54 forms the outermost upper edge of a roadplate fixed to the support by means of magnets 55 and of which the left upper edge 54 is exactly above the point 56 of the support arm. If necessary the support can be provided with a small abutment as indicated by the interrupted line 57.

If necessary the upper side can be provided with holes 63 for applying clamping screws.

Leg 43 has a scale 58 at the same side as the scale 59 on the integral and movable parts of the support arms 47 and 50 respectively. Scale 58 cooperates with scale 61 of the housing 44.

The base plate has a marking line 60 to indicate the proper spacing between the supports. Pivot point 54 is exactly vertically above the backside 62 so that an exact location of the supports upon the plan view of the roadplan is possible. Holes 64 serve to secure the supports upon the table.

Finally it is possible to dismantle the model and to rebuild it, since storing the model corresponds to storing a table or the like. This means that the space available for making models is less and can be smaller. It is furthermore simple to rebuild the models at any desired place, such as exhibitions, whilst further said method is very suitable for didactic purposes, such as at in schools.

What we claim is:

1. A method of manufacturing a scale model of a road and the like, comprising drawing a plan view of the road on flexible material, marking on the road plan a plurality of coordinates corresponding to transverse lines on the road whose elevation and inclination are known, arranging on a flat surface a plurality of adjustable supports having upper support arms with the position of the supports and the elevation and inclination of the support arms each corresponding to a said coordinate on the road plan, cutting the road plan from the flexible material, and laying the cut-out road plan on the support arms with each support arm in registry with the corresponding coordinate on the road plan.

2. A method as claimed in claim 1, and magnetically attracting the cut-out road plan to the support arms.

3. A method as claimed in claim 1, and filling the region about the supports with granular material to indicate the assoiated terrain.

4. A method as claimed in claim 3, in which said granular material is particles of synthetic resin.

5. A method as claimed in claim 3, and applying a binder to said granular material to hold said granular material in the contour of said terrain.

6. A scale model obtained by the method of claim 1.

* * * * *

UNITED STATES PATENT OFFICE
CERTIFICATE OF CORRECTION

Patent No. 3,844,052                     Dated October 29, 1974

Inventor(s) Marinus Joost Fraanje et al.

It is certified that error appears in the above-identified patent and that said Letters Patent are hereby corrected as shown below:

On the Cover Sheet, the following should be added:

[30] Foreign Application Priority Data

| August 9, 1971 | Netherlands | 71.10942 |
| May 31, 1972 | Netherlands | 72.07364 |
| May 31, 1972 | Netherlands | 72.07365 |

Signed and sealed this 4th day of March 1975.

(SEAL)
Attest:

RUTH C. MASON
Attesting Officer

C. MARSHALL DANN
Commissioner of Patents
and Trademarks